United States Patent
Buchanan, Jr. et al.

[11] Patent Number: 5,549,183
[45] Date of Patent: Aug. 27, 1996

[54] MOTOR LOCKING UNIT

[75] Inventors: Harry C. Buchanan, Jr., Spring Valley; Peter S. Zhou, Dayton, both of Ohio

[73] Assignee: ITT Automotive Electrical Systems, Inc., Auburn Hills, Mich.

[21] Appl. No.: 443,012

[22] Filed: May 17, 1995

[51] Int. Cl.$^6$ .................................................. F16D 65/00
[52] U.S. Cl. .................................................. 188/265; 188/69
[58] Field of Search .......................... 188/265, 31, 69; 477/183, 184, 199

[56] References Cited

U.S. PATENT DOCUMENTS

| | | | |
|---|---|---|---|
| 3,704,757 | 12/1972 | Buress | 477/199 |
| 5,133,201 | 7/1992 | LaMott | 188/265 |
| 5,219,049 | 6/1993 | Unterborn | 188/156 |
| 5,379,866 | 1/1995 | Pearce | 188/31 |

*Primary Examiner*—Robert J. Oberleitner
*Assistant Examiner*—C. T. Bartz
*Attorney, Agent, or Firm*—Ratner & Prestia

[57] ABSTRACT

A locking unit for a motor which is to be locked in which a plurality of fingers at the ends of flexible arms, coupled to a locking motor, move into and out from engagement with a plurality of spaces bounded by ridges in a member which is connected to the shaft of the motor to be locked.

13 Claims, 4 Drawing Sheets

MOTOR LOCKING UNIT

TECHNICAL FIELD

The present invention relates, in general, to locking motors in place and, in particular, to a motor locking unit particularly useful in holding in place a motor which sets a vehicle component, such as a parking brake or passenger seat, after the vehicle component has been set in place.

BACKGROUND OF THE INVENTION

Motors are commonly used to set other components in place. For example, in many vehicles, the position and disposition of the passenger seats can be adjusted by controlling motors rather than by manual maneuvers.

In such arrangements and others, it is important that, after the component has been set in place by the motor, the component is prevented from unintentional movement. This can be achieved by applying some form of lock directly to the component or to the motor which controls movement of the component. Locking the component directly involves a separate means for actuation, while locking the motor which sets the component can be effected simply upon deactivation of the motor after control of the component has been completed.

SUMMARY OF THE INVENTION

A motor locking unit, constructed in accordance with the present invention, includes a locking motor having a shaft and a locking disc adapted for connection to and movement with the shaft of a motor which is to be locked. The locking disc has a hub disposed perpendicular to and centered on the axis of the shaft of the locking motor and a plurality of alternating spaces and ridges extending radially outward of the hub of the locking disc. A motor locking unit, constructed in accordance with the present invention, also includes a locking member having a hub disposed perpendicular to and centered on the axis of the shaft of the locking motor and a plurality of flexible fingers extending radially outward from the hub of the locking member and toward the locking disc engaging the locking disc in the spaces and between the ridges of the locking disc when the locking member is moved longitudinally of the axis of the shaft of the locking motor. A motor locking unit, constructed in accordance with the present invention, further includes means for coupling the shaft of the locking motor to the hub of the locking member to impart to the hub of the locking member, in response to rotary movement of the shaft of the locking motor, longitudinal movement along the axis of the shaft of the locking motor in: (a) a first direction in response to rotary movement of the shaft of the locking motor in a first direction to move the fingers of the locking member into the spaces and between the ridges of the locking disc and (b) a second direction, opposite to the first direction of longitudinal movement of the hub of the locking member, in response to rotary movement of the shaft of the locking motor in a second direction, opposite to the first direction of rotary movement of the shaft of the locking motor, to move the fingers of the locking member out from the spaces and between the ridges of the locking disc.

DETAILED DESCRIPTION OF THE INVENTION

Figure 1A:
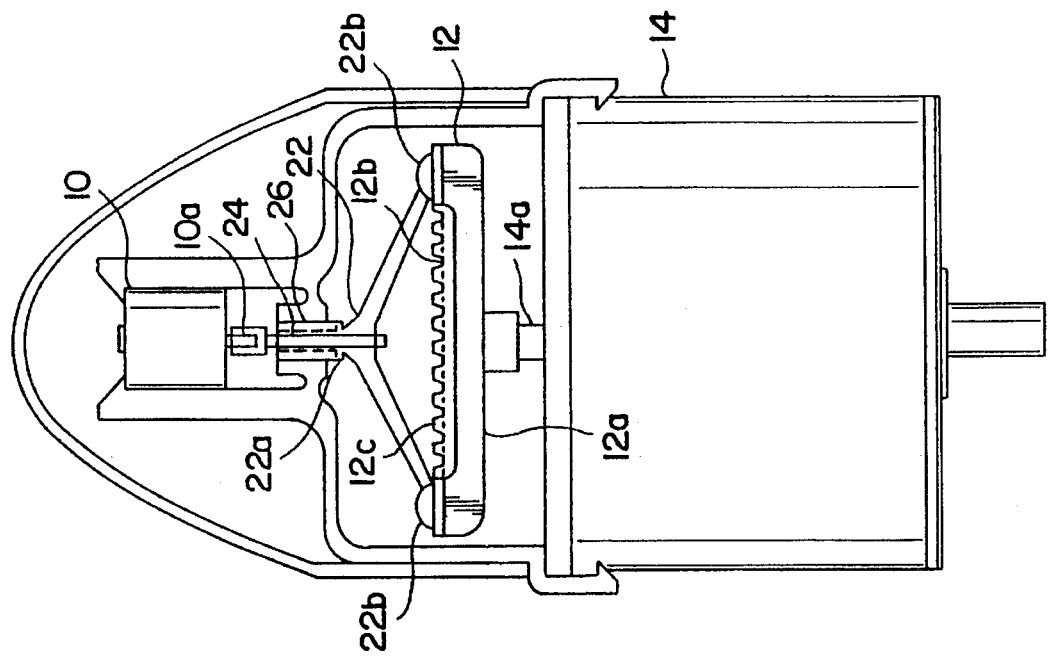
FIG. 1A is a side view, partially in section, of a first embodiment of a motor locking unit constructed in accordance with the present invention in the "unlocked" condition.

Referring to FIGS. 1A, 1B, 2A, 2B and 3, a motor locking unit, constructed in accordance with the present invention, includes a locking motor 10 having a shaft 10a. Locking motor 10 may be a commercially available miniature motor of conventional construction and operation.

A motor locking unit, constructed in accordance with the present invention, also includes a locking disc 12 adapted for connection to and movement with the shaft 14a of a motor 14 which is to be locked. Locking disc 12 has a hub 12a disposed perpendicular to and centered on the axis of shaft 10a of locking motor 10 and a plurality of alternating spaces 12b and ridges 12c extending radially outward of hub 12a of locking disc 12. For the embodiment of the invention being described, locking disc 12 is cup-shaped and the plurality of alternating spaces 12b and ridges 12c is in an annular ring at the periphery of the locking disc. The number of spaces 12b and ridges 12c of locking disc 12 is dependent upon the application and this will be better understood after a locking member which functions with locking disc 12 is described below. In a typical application, locking disc 12 has at least sixty spaces and sixty ridges.

A motor locking unit, constructed in accordance with the present invention, further includes a locking member 22 having a hub 22a disposed perpendicular to and centered on the axis of shaft 10a of locking motor 10 and a plurality of fingers 22b at the ends of flexible arms 22c which extend radially outward from hub 22a of locking member 22 and toward locking disc 12. Fingers 22b engage the locking disc in spaces 12b and between ridges 12c when locking member 22 is moved longitudinally of the axis of shaft 10a of locking motor 10. For the embodiment of the invention being described, hub 22a of locking member 22 is cylindrical and extends along the axis of shaft 10a of locking motor 10. Locking member 22 has three flexible arms 22c, each arm having a finger 22b at an outward end of its arm. Each finger 22b has curved bearing surfaces and is in one of the spaces 12b and between two of the ridges 12c of locking disc 12.

Figure 1B:
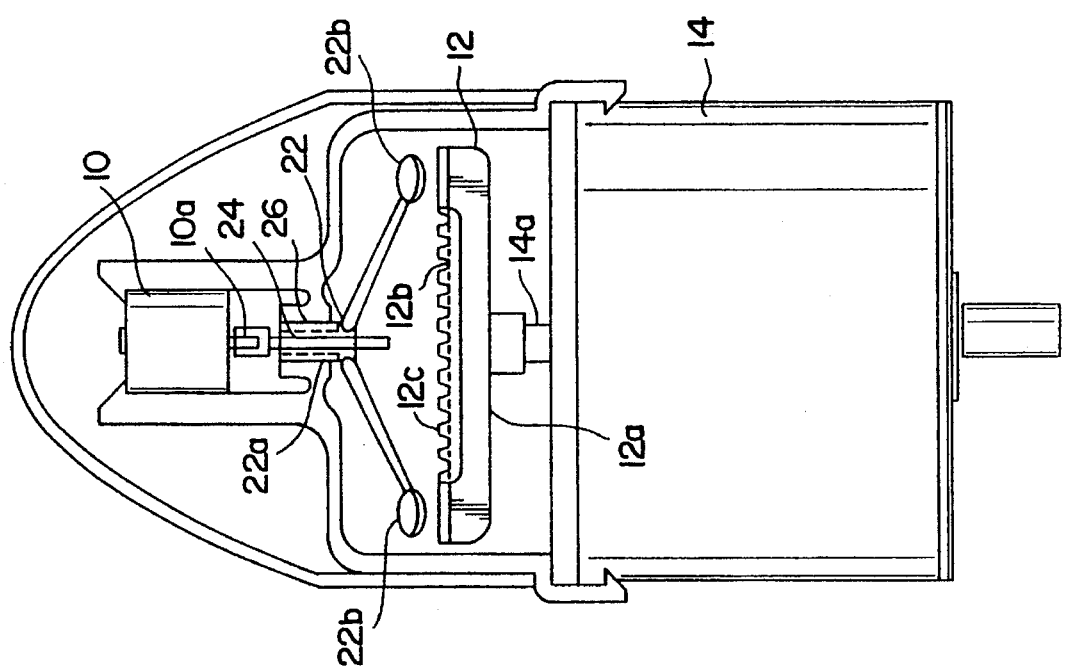
FIG. 1B is a side view, partially in section, of the first embodiment of a motor locking unit constructed in accordance with the present invention in the "locked" condition.
Figure 4:
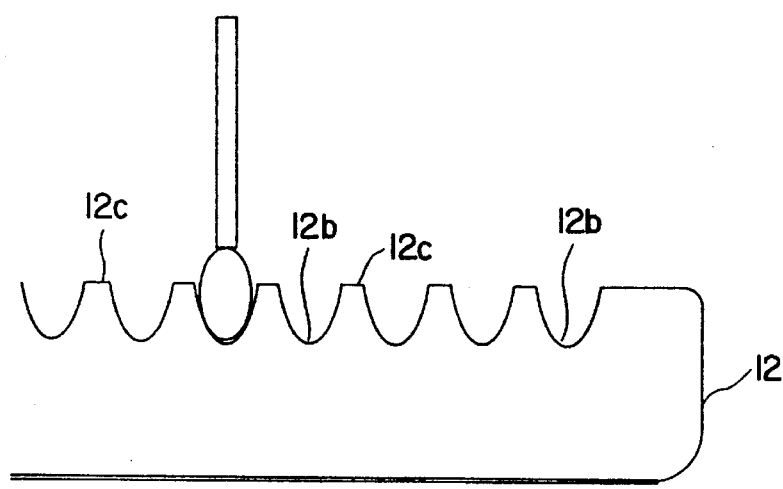
FIGS. 4 and 5 are profile views of two shapes of the spaces and ridges of the locking disc portion of the FIGS. 1A and 1B motor locking unit.
Figure 5:
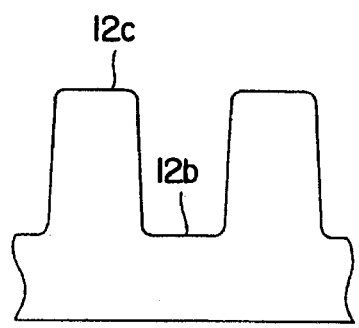

FIGS. 4 and 5 are profile views of two shapes of the spaces 12b and ridges 12c of the locking disc portion of the FIGS. 1A and 1B motor locking unit. In FIG. 4, ridges 12c of locking disc 12 have curved sidewall bearing surfaces and in FIG. 5, ridges 12c of locking disc 12 have straight side-wall bearing surfaces which are inclined. In either case, the curved side-wall bearing surface or the inclined sidewall bearing surface, spaces 12b and ridges 12c are shaped to optimize entry into and removal from spaces 12b and between ridges 12c of fingers 22b of locking member 22 when intended and bearing of fingers 22b against the sidewalls of ridges 12b to prevent removal of the fingers from spaces when not intended.

Figure 2A:
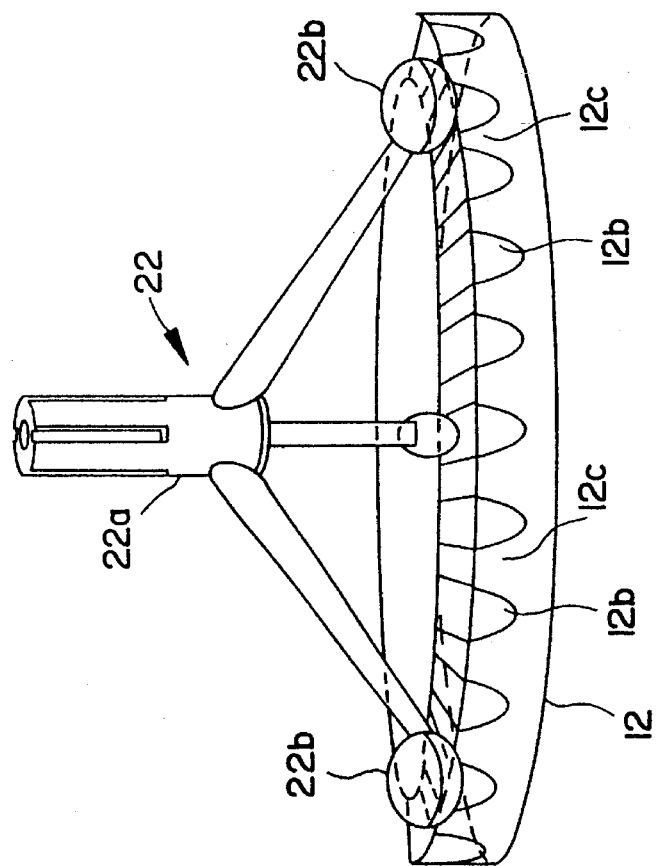
FIG. 2A is a perspective view of the locking member and locking disc portions of the FIGS. 1A and 1B motor locking unit in the "unlocked" condition.
Figure 2B:
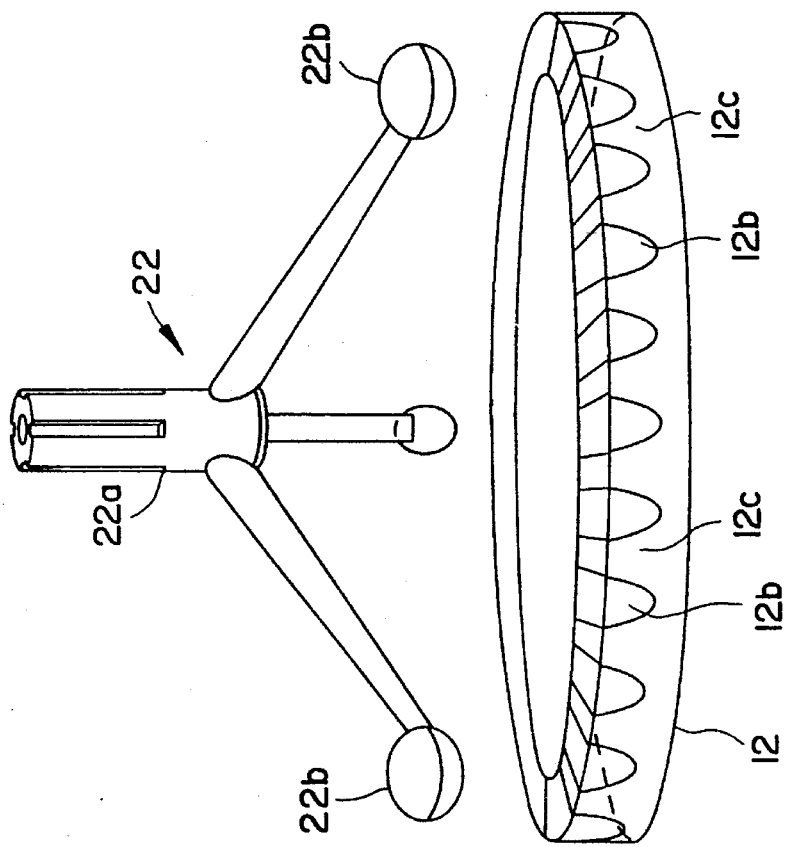
FIG. 2B is a perspective view of the locking member and locking disc portions of the FIGS. 1A and 1B motor locking unit in the "locked" condition.
Figure 3:
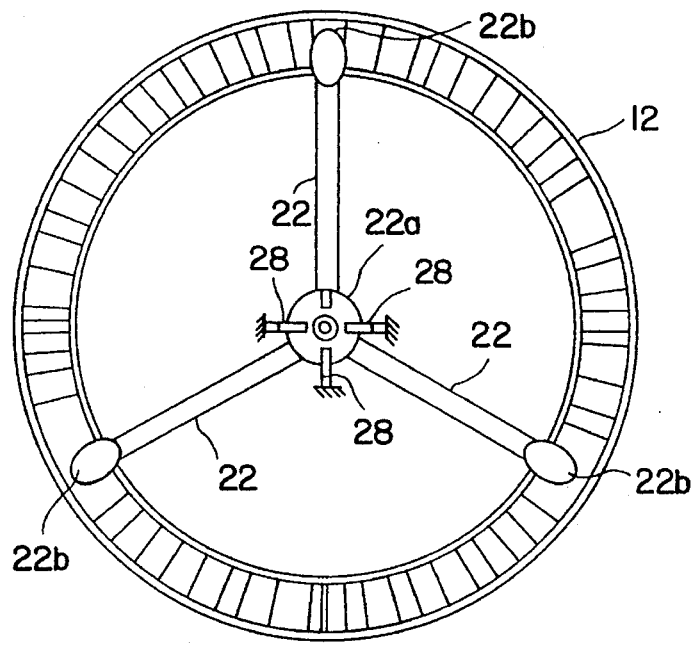
FIG. 3 is a top view of the locking member and locking disc portions of the FIGS. 1A and 1B motor locking unit in the "locked" condition.

Returning to FIGS. 1A, 1B, 2A, 2B and 3, a motor locking unit, constructed in accordance with the present invention, further includes means for coupling shaft 10a of locking motor 10 to hub 22a of locking member 22 to impart to hub 22a of locking member 22, in response to rotary movement of shaft 10a of locking motor 10, longitudinal movement along the axis of shaft 10a of locking motor 10 in: (a) a first direction in response to rotary movement of shaft 10a of locking motor 10 in a first direction to move fingers 22b of locking member 22 into spaces 12b and between ridges 12c of locking disc 12, and (b) a second direction, opposite to the first direction of longitudinal movement of hub 22a of locking member 22, in response to rotary movement of shaft 10a of locking motor 10 in a second direction, opposite to the first direction of rotary movement of shaft 10a of locking motor 10 to move fingers 22b of locking member 22 out from spaces 12b and between ridges 12c of locking disc 12. FIGS. 1A and 2A show the motor locking unit of the present invention in the "unlocked" condition with fingers 22b of locking member 22 not in engagement with spaces 12b and between ridges 12c of locking disc 12, while FIGS. 1B and 2B show the motor locking unit of the present invention in the "locked" condition with fingers 22b of locking member 22 in engagement with spaces 12b and between ridges 12c of locking disc 12.

The coupling means include, for the embodiment of the invention being described, an externally threaded member 24 to which rotary movement of shaft 10a of locking motor 10 is imparted and an internally threaded member 26 fixed to hub 22a of locking member 22 along the axis of shaft 10a of locking motor 10 and engaged by externally threaded member 24. Rotary movement of locking member 22 is restrained by a plurality on vanes 28, shown most clearly in FIG. 3, which are received individually in a plurality of recesses in the outer surface of cylindrical hub 22a of locking member 22. Vanes 28 are adapted for attachment to a fixed reference, thereby preventing locking member 22 from undergoing rotary movement as externally threaded member 24 is driven by shaft 10a of locking motor 10.

In operation, after motor 14 has set a component, such as the parking brake or a passenger seat of a vehicle, locking motor 10 is actuated. This causes externally threaded member 24 to rotate in response to rotary movement of shaft 10a of locking motor 10. With hub 22a of locking member 22 restrained from rotation by vanes 28, the locking member moves downward because of the engagement of externally threaded member 24 and internally threaded member 26. Fingers 22b of locking member 22 move into spaces 12b and into engagement with ridges 12c of locking disc 12 fixed to motor 14 to lock motor 14. The shaping of fingers 22b and the flexibility of arms 22c are such that the fingers "self-align" with spaces 22b and between ridges 12c and enter these spaces. When motor 14 is to be unlocked, locking motor 10 rotates in the opposite direction causing fingers 22b of locking member 22 to withdraw from spaces 12b and between ridges 12c of locking disc 12.

Figure 6A:
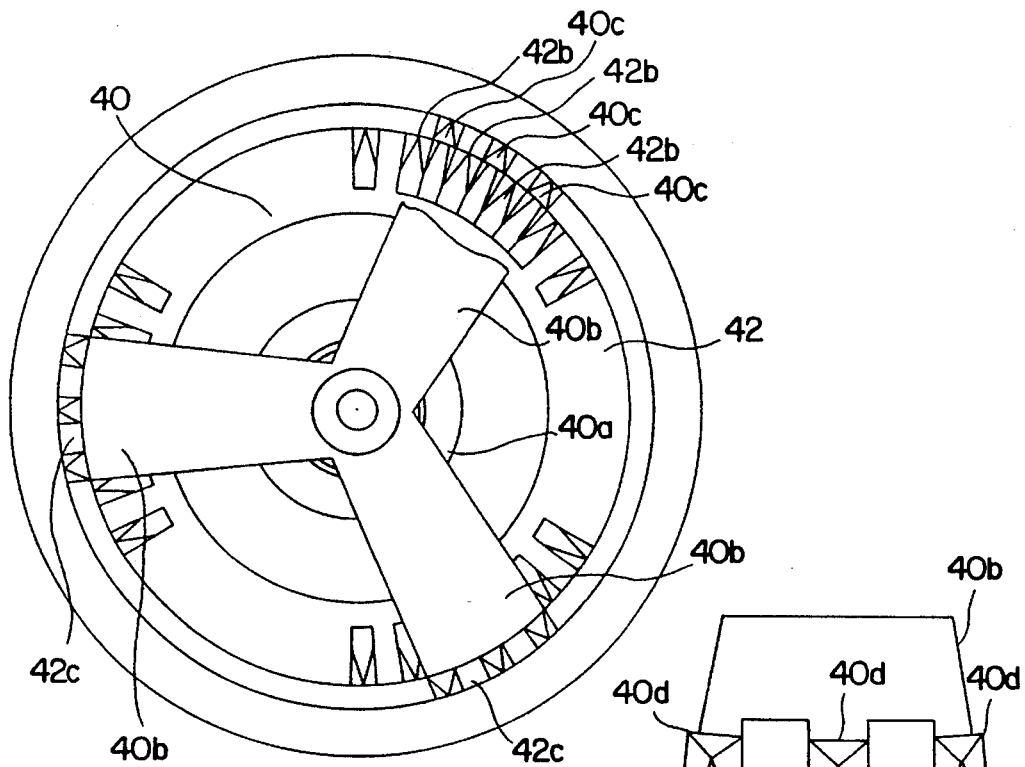
FIGS. 6A, 6B and 6C are top, front and side top views, respectively, of parts of the locking member and locking disc portions of a second embodiment of a motor locking unit constructed in accordance with the present invention.
Figure 6B:
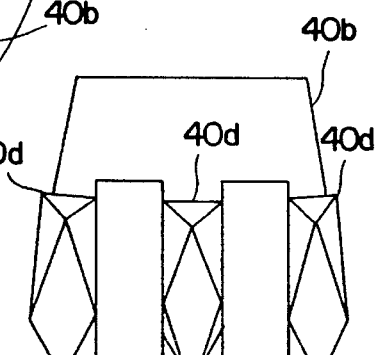
Figures 6C, 6D:
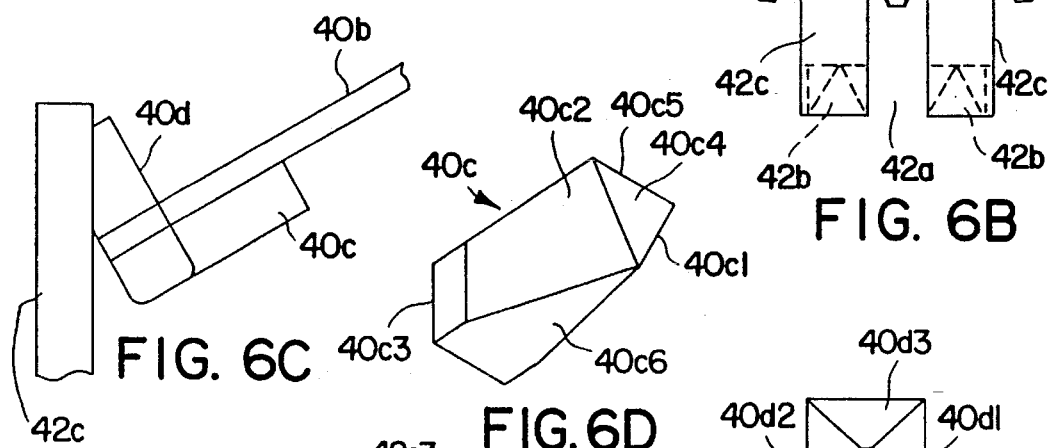
FIGS. 6D and 6E are perspective views of parts of the locking member portion and locking disc portion, respectively, of the second embodiment of a motor locking unit constructed in accordance with the present invention.

The second embodiment of a motor locking unit, constructed in accordance with the present invention, differs from the first embodiment by the arrangement and shapes of the parts of the locking member and the arrangement and shapes of the parts of the locking disc by which the locking member engages or is separated from the locking disc. In FIGS. 6A and 6C, the locking member and locking disc are in the "unlocked" condition, while in FIG. 6B, the locking member and locking disc are in the "locked" condition.

Referring to FIGS. 6A, 6B, 6C, 6D, 6E and 6F, locking member 40 has a hub 40a and three flexible arms 40b extending radially from hub 40a. Each arm 40b has a plurality of fingers 40c at an outward end of the arm which are secured to the bottom of the arm. Fingers 40c fit within spaces 42a and between ridges 42b of locking disc 42.

As shown most clearly in FIG. 6D, each of the fingers 40c of locking member 40 has first and second double-tapered bearing surfaces 40c1 and 40c2. A first taper extends radially from a wider radially inner end 40c3 to a narrower radially outer end 40c4. A second taper extends vertically from a wider top 40c5 to a narrower bottom 40c6.

Figures 6E, 6F:
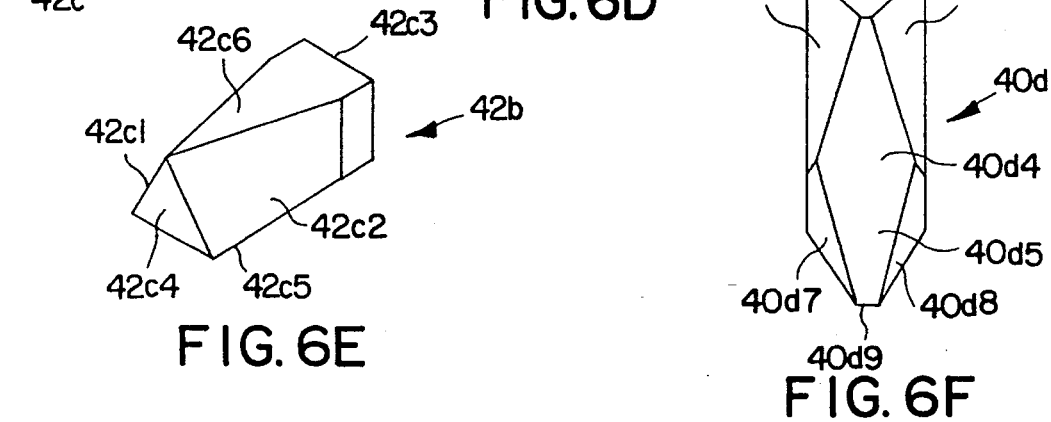
FIG. 6F is a front view of a part of the locking member portion of the second embodiment of a motor locking unit constructed in accordance with the present invention.

As shown most clearly in FIG. 6E, each of the ridges 42b of locking disc 42 is generally similar in construction to but an inverted version of finger 40c of locking member 40 and has first and second double-tapered bearing surfaces 42c1, and 42c2. A first taper extends radially from a wider radially inner end 42c3 to a narrower radially outer end 42c4. A second taper extends vertically from a wider bottom 42c5 to a narrower top 42c6.

Locking member 40 further includes a plurality of vertically disposed stop members 40d, one associated with each of the fingers 40c, at the narrower radially outer ends 40c4 of fingers 40c. Locking disc 42 further includes a plurality of vertically disposed stop members 42c, one associated with each of the ridges 42b, at the narrower radially outer ends 42c4 of ridges 42b.

Each of the stop members 40d of locking member 40 has first and second double-tapered bearing surfaces 40d1 and 40d2 with a first taper extending vertically from a narrower upper end 40d3 to a wider section 40d4 aligned with the top 40c5 of the associated finger 40c and a second taper extending from the radially outer end 40c5 of the associated finger 40c to a radially outer end 40d5 of the stop member.

Each of the stop members 40d of locking member 40 also has third and fourth tapered bearing surfaces 40d7 and 40d8 with each extending vertically from the wider section 40d4 of the stop member to a narrower lower end 40d9 of the stop member.

In operation, as locking member 40 moves downward, fingers 40c of the locking member move into spaces 42a and into engagement with ridges 42b of locking disc 42. This is shown most clearly in FIGS. 6A, 6B and 6C. The shaping of ridges 42c, the sizes of spaces 42a between ridges 42c, the shaping of fingers 40c and the flexibility of arms 40b "self-align" the fingers 40c within spaces 42a and between ridges 42c and the fingers enter these spaces. When motor 14 is to be unlocked, fingers 40c of locking member 40 withdraw from spaces 42a and between ridges 42b of locking disc 42.

It should be noted that the cross-section of arms 40b of locking member 40 can be held constant or arms 40b can be arranged with a cross-section which varies so that the arms provide a constant stress.

While there have been described preferred embodiments of the present invention, it will be obvious to those skilled in the art that various changes and modifications may be made without departing from the spirit and scope of the invention as defined in the following claims.

What is claimed:

1. A motor locking unit comprising:

a locking motor having a shaft;

a locking disc adapted for connection to and movement with the shaft of a motor which is to be locked, said locking disc having:

(a) a hub disposed perpendicular to and centered on the axis of said shaft of said locking motor, and (b) a plurality of alternating spaces and ridges extending radially outward of said hub of said locking disc;

a locking member having:

(a) a hub disposed perpendicular to and centered on the axis of said shaft of said locking motor, (b) a plurality of arms extending radially outward from said hub of said locking member and toward said locking disc, and (c) a plurality of fingers at radially outer ends of said arms engaging said locking disc in said spaces and between said ridges when said locking member is moved longitudinally of the axis of said shaft of said locking motor; and means for coupling said shaft of said locking motor to said hub of said locking member to impart to said hub of said locking member, in response to rotary movement of said shaft of said locking motor, longitudinal movement along the axis of said shaft of said locking motor in:

(a) a first direction in response to rotary movement of said shaft of said locking motor in a first direction to move said fingers of said locking member into said spaces and between said ridges of said locking disc, and (b) a second direction, opposite to the first direction of longitudinal movement of said hub of said locking member, in response to rotary movement of said shaft of said locking motor in a second direction, opposite to the first direction of rotary movement of said shaft of said locking motor to move said fingers of said locking member out from said spaces and between said ridges of said locking disc.

2. A motor locking unit according to claim 1 wherein said plurality of alternating spaces and ridges of said locking disc is in an annular ring at the periphery of said locking disc.

3. A motor locking unit according to claim 2 wherein said locking disc is cup-shaped and said plurality of alternating spaces and ridges is at the periphery of said cup-shaped locking disc.

4. A motor locking unit according to claim wherein said coupling means include:

(a) an externally threaded member to which rotary movement of said shaft of said locking motor is imparted, (b) an internally threaded member fixed to said hub of said locking member along the axis of said shaft of said locking motor and engaged by said externally threaded member, and (c) means for restraining rotary movement of said locking member.

5. A motor locking unit according to claim 4 wherein:

(a) said hub of said locking member is cylindrical and extends along the axis of said shaft of said locking motor, and (b) said restraining means include:

(1) a plurality of recesses in the outer surface of said cylindrical hub of said locking member, and (2) a plurality on vanes which are received individually in said recesses and are adapted for attachment to a fixed reference.

6. A motor locking unit according to claim 2 wherein said locking member has three flexible arms, each arm having a finger at a radially outer end thereof and in one of said spaces and between two of said ridges of said locking disc.

7. A motor locking unit according to claim 6 wherein:

(a) said fingers have curved bearing surfaces, and (b) said ridges of said locking disc have curved side-wall bearing surfaces.

8. A motor locking unit according to claim 6 wherein:

(a) said fingers have curved bearing surfaces, and (b) said ridges of said locking disc have straight side-wall bearing surfaces.

9. A motor locking unit according to claim 8 wherein said straight side-walls bearing surfaces are inclined.

10. A motor locking unit according to claim 2 wherein said locking member has a three flexible arms, each arm having a plurality of fingers at a radially outer end thereof and in said spaces and between said ridges of said locking disc.

11. A motor locking unit according to claim 10 wherein:

(a) each of said fingers of said locking member has first and second double-tapered bearing surfaces with:

(1) a first taper extending radially from a wider radially inner end to a narrower radially outer end, and (2) a second taper extending vertically from a wider top to a narrower bottom, and (b) each of said ridges of said locking disc has first and second double-tapered bearing surfaces with:

(1) a first taper extending radially from a wider inner end to a narrower outer end, and (2) a second taper extending vertically from a wider bottom to a narrower top.

12. A motor locking unit according to claim 11 wherein:

(a) said locking member further includes a plurality of vertically disposed stop members, one associated with each of said fingers, at said narrower radially outer ends of said fingers, and (b) said locking disc further includes a plurality of vertically disposed stop members, one associated with each of said ridges, at said narrower radially outer ends of said ridges.

13. A motor locking unit according to claim 12 wherein each of said stop members of said locking member has:

(a) first and second double-tapered bearing surfaces with:

(1) a first taper extending vertically from a narrower upper end thereof to a wider section aligned with said top of said associated finger, and (2) a second taper extending from said associated finger to a radially outer end thereof, and (b) third and fourth tapered bearing surfaces with each extending vertically from said wider section aligned with said top of said associated finger to a narrower lower end thereof.

* * * * *

UNITED STATES PATENT AND TRADE MARK OFFICE
CERTIFICATE OF CORRECTION

PATENT NO. : 5,549,183
DATED : August 27, 1996
INVENTOR(S) : Buchanan, Jr. et al..

It is certified that error appears in the above-identified patent and that said Letters Patent is hereby corrected as shown below:

At column 5, line 54, after "claim", insert --1--.

At column 6, line 25, after "has", delete "a".

Signed and Sealed this

Twenty-fifth Day of March, 1997

*Attest:*

BRUCE LEHMAN

*Attesting Officer*     *Commissioner of Patents and Trademarks*